(12) United States Patent
Huang et al.

(10) Patent No.: US 8,731,294 B2
(45) Date of Patent: May 20, 2014

(54) IDENTIFYING MULTIPLE RECTANGULAR AREAS IN A MULTI PROJECTOR SYSTEM

(75) Inventors: Hung Khei Huang, Irvine, CA (US);
Sangwon Chae, Irvine, CA (US);
Yasuhiro Komori, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 12/972,274

(22) Filed: Dec. 17, 2010

(65) Prior Publication Data
US 2012/0155771 A1  Jun. 21, 2012

(51) Int. Cl.
*G06K 9/34* (2006.01)

(52) U.S. Cl.
USPC ............................................. 382/173

(58) Field of Classification Search
None
See application file for complete search history.

(56) References Cited

U.S. PATENT DOCUMENTS

| | | | |
|---|---|---|---|
| 7,019,713 B2 | 3/2006 | Hereld et al. | |
| 7,215,362 B2 | 5/2007 | Klose | |
| 2007/0124766 A1* | 5/2007 | Relan et al. | 725/38 |
| 2008/0002160 A1 | 1/2008 | Chang et al. | |
| 2011/0050873 A1* | 3/2011 | Nelson | 348/61 |
| 2012/0147046 A1* | 6/2012 | Chao | 345/641 |

* cited by examiner

*Primary Examiner* — Barry Drennan
*Assistant Examiner* — David F Dunphy
(74) *Attorney, Agent, or Firm* — Fitzpatrick, Cella, Harper & Scinto (57) ABSTRACT

Determination of locations of multiple rectangular areas within a composite projection area formed on a projection surface by a projector array of multiple projectors. A location of a maximum rectangular area is determined within the composite projection area. Available regions comprise regions unoccupied by previously-located rectangular areas. The maximum rectangular area is removed from the available regions. The following are iteratively repeated: determining a location of a next maximum rectangular area and removing the next maximum rectangular area from the available regions, until a stopping condition is met. A list of determined locations for rectangular areas within the composite projection area is provided after the stopping condition has been met.

23 Claims, 9 Drawing Sheets

FIG. 7F

IDENTIFYING MULTIPLE RECTANGULAR AREAS IN A MULTI PROJECTOR SYSTEM

FIELD

The present disclosure relates to identification of one or more rectangular areas within a composite projection area formed on a projection surface by a projector array of multiple projectors.

BACKGROUND

A multi-projector system typically involves an array of projectors that each project onto a projection surface to form a composite projection area on the projection surface. Typically, a largest rectangular projection area is identified within the composite projection area, and images are projected within the largest rectangular projection area.

SUMMARY

The inventors herein have observed that the composite projection area formed by the projection system often includes multiple rectangular projection areas within which images may be projected.

Figure 1:
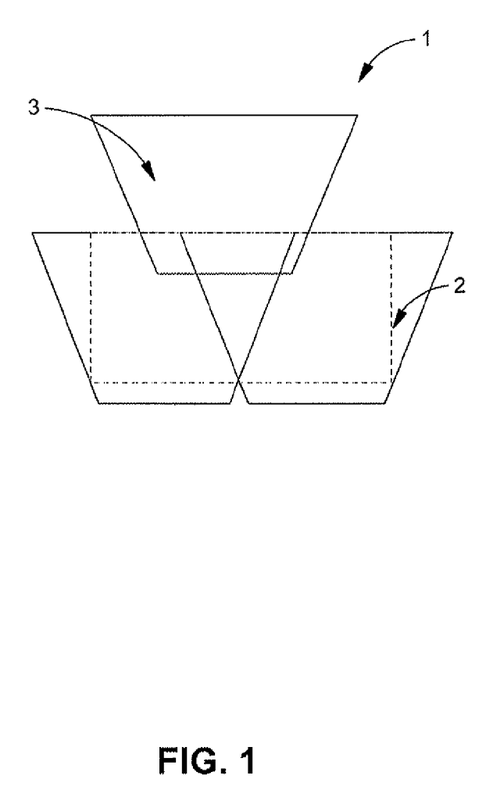
FIG. 1 is an illustration of a largest rectangle that is identified in a composite projection area.

However, typical multi-projector systems ordinarily identify only the largest rectangular projection area. Accordingly, when using typical multi-projector systems, it is possible that large rectangular areas within the composite projection area will not be utilized after the largest rectangular area has been determined. This case is illustrated in FIG. 1, which shows a largest rectangle 2 that is identified in a composite projection area 1. As shown in FIG. 1, the top area 3 is not utilized during image projection.

The foregoing situation is addressed by identifying multiple rectangular areas within a composite projection area by iteratively determining a location of a maximum rectangular area, removing the maximum rectangular area from available regions within the composite projection area, and determining a location of a next maximum rectangular area, until a stopping condition is met.

Thus, in an example embodiment described herein, locations of multiple rectangular areas are determined within a composite projection area formed on a projection surface by a projector array of multiple projectors. More specifically, a location of a maximum rectangular area is determined within available regions in the composite projection area. Available regions comprise regions unoccupied by previously-located rectangular areas. The maximum rectangular area is removed from the available regions. The following are iteratively repeated: determining a location of a next maximum rectangular area and removing the next maximum rectangular area from the available regions, until a stopping condition is met. A list of determined locations for rectangular areas within the composite projection area is provided after the stopping condition has been met.

By virtue of this arrangement, it is ordinarily possible to utilize a composite projection area more efficiently, because multiple rectangular areas within the composite projection area are identified within which images may be projected.

In another example embodiment described herein, the stopping condition comprises a determination of whether available regions within the composite projection area exceed a minimum area threshold, and the stopping condition is met when it is determined that there are no available regions that exceed the minimum area threshold.

In another example embodiment described herein, small areas that do not exceed a minimum threshold are removed from the available regions after the maximum rectangular area is removed from the available regions and before a next iteration of determining location of a maximum rectangular area within the available regions. The minimum threshold is specified by at least one of a minimum area, a minimum height, a minimum width, and a minimum number of pixels of a region within the composite projection area.

In another example embodiment described herein, during the determination of the location of a maximum rectangular area, the maximum rectangular area is constrained to a pre-designated aspect ratio.

In another example embodiment described herein, the multiple rectangular areas are mutually exclusive of each other.

This brief summary has been provided so that the nature of this disclosure may be understood quickly. A more complete understanding can be obtained by reference to the following detailed description and to the attached drawings.

DETAILED DESCRIPTION

Figure 2:
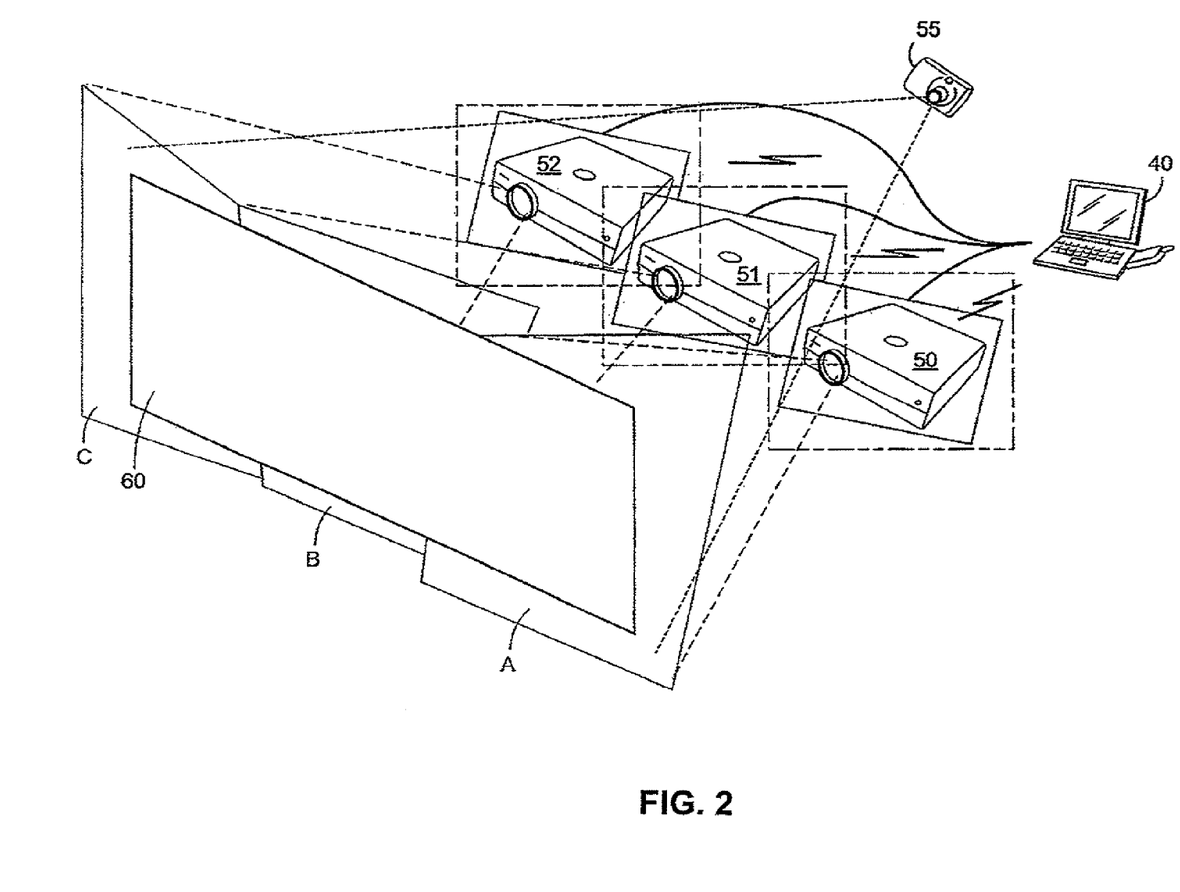
FIG. 2 is representative view of a multiprojector system relevant to one example embodiment.

FIG. 2 is representative view of a multiprojector system including a projector array, a host computer and camera, relevant to one example embodiment. Host computer 40 generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Host computer 40 includes a color monitor including a display screen, a keyboard for entering text data and user commands, and a pointing device. The pointing device can be, for example, a mouse for pointing and for manipulating objects displayed on the display screen.

Host computer 40 also includes one or more non-transitory computer-readable storage medium which is constructed to retrievably store computer-readable information such as computer-executable process steps. The non-transitory computer-readable storage medium on which a computer-executable program or process steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nano system, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

Host computer 40 may acquire image data from other sources such as a digital camera, a local area network or the Internet via a network interface. Likewise, host computer 40 may interface with color output devices other than projectors 50 to 52, such as color output devices accessible over the network interface.

Host computer 40 acquires image data for an input image, and provides image data to each of projectors 50 to 52 such that corresponding image 60 is displayed on a projection surface. In addition, the image data is provided for display by projectors 50 to 52 such that the image 60 is substantially aligned with the projection screen.

In this example, projectors 50 to 52 are RGB or RGBW projectors, such as DLP™ digital projectors or other display devices that project images in accordance with image data from the host computer 40 onto a projection surface. Projectors 50 to 52 may be HDR devices capable of projecting HDR images, and may further include, for example, LCD projectors, LCOS projectors, LED projectors, and the like.

Together, projectors 50 to 52 make up a projector array, and in accordance with image data received from host computer 40, projectors 50 to 52 project image 60 onto a projection screen by using additive light combinations of red (R), green (G) and blue (B) colorant lights. In addition, and particularly in a case of an HDR device, projectors 50 to 52 also use a white (W) light so as to increase the brightness/luminance of projected images and thereby project HDR images with good fidelity over a large dynamic range.

Digital color camera 55 is an example of a color input device, and is provided for sending digital image data to host computer 40. In particular, digital color camera 55 captures images of the projection surface of the projector array in order to facilitate control of the multiprojector system.

FIG. 2 shows an example wherein projectors 50 to 52 are positioned to form one composite projection area. As shown in FIG. 2, projector 50 displays individual projection area A, projector 51 displays individual projection area B and projector 52 displays individual projection area C. In other words, individual projection areas A, B and C are respectively displayed when projectors 50 to 52 independently display white light. In this case, individual projection areas A, B and C together comprise the composite projection area, and image data is provided by host computer 40 such that each of projectors 50 to 52 displays the appropriate portion of image 60 on the composite projection area on the projection surface.

Each individual projection area A, B and C are initially identified as available regions, meaning that the location of the maximum rectangular area within individual projection areas A, B, and C is determined during the first iteration of the maximum rectangular area determination process, as will be described below in more detail. In subsequent iterations, portions of the individual projection areas may be removed, and in such cases the remaining portions are identified as available regions.

After a maximum rectangular area is removed from the composite projection area, as will be described below, plural separate projection areas may be identified that are non-overlapping and/or non-contiguous. Each such separate projection area is formed by one or more available regions, and will be referred to hereafter as an object.

Figure 3:
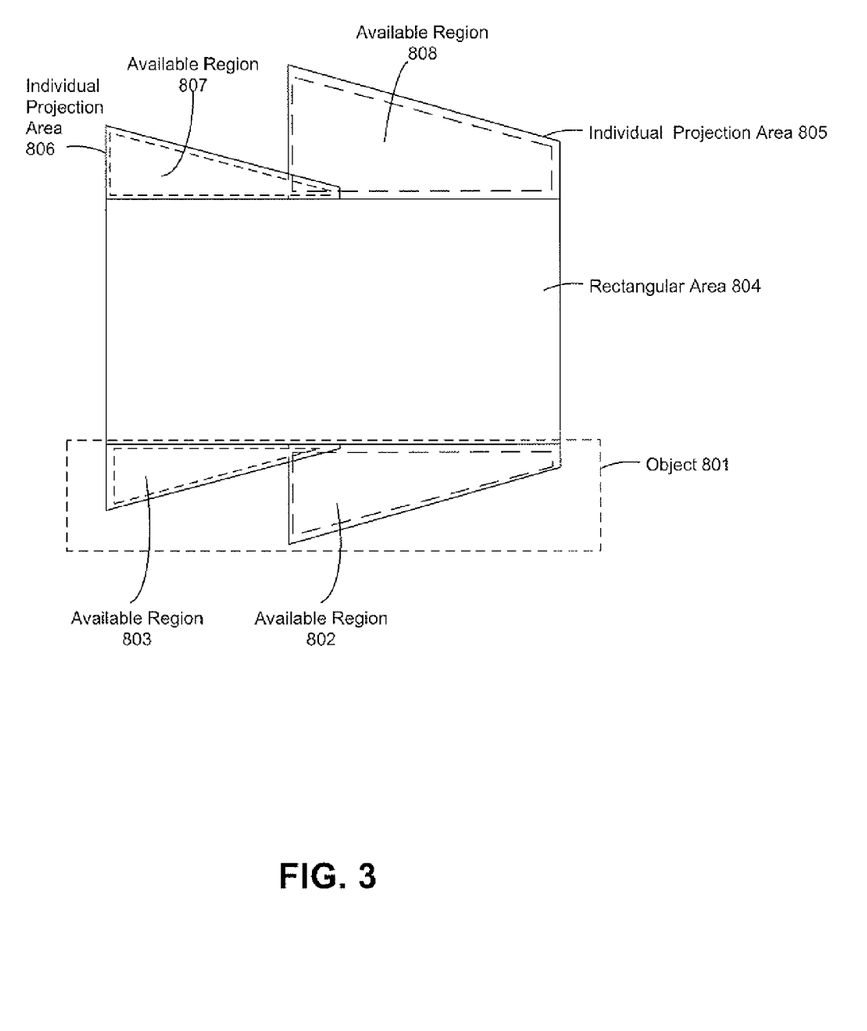
FIG. 3 illustrates available regions within a projection area.

FIG. 3 is an illustration for explaining the relationship between individual projection areas, available regions, a maximum rectangular area, and objects. As shown in FIG. 3, individual projection areas 805 and 806 are formed by two projectors, and individual projection areas 805 and 806 form a composite projection area. Initially, individual projection areas 805 and 806 are identified as available regions. However, after rectangular area 804 is identified and removed from the initial available regions, new available regions 802, 803, 807 and 808 remain. As shown in FIG. 3, available regions 802 and 808 are portions of individual projection area 805, and available regions 803 and 807 are portions of individual projection area 806. Available regions 802 and 803 overlap to form object 801. Similarly, available regions 807 and 808 overlap to form another object that is separate from object 801. Each object is a projection area within which subsequent rectangular areas are identified, such rectangular areas being areas within which images or portions of images are projected.

Figure 4:
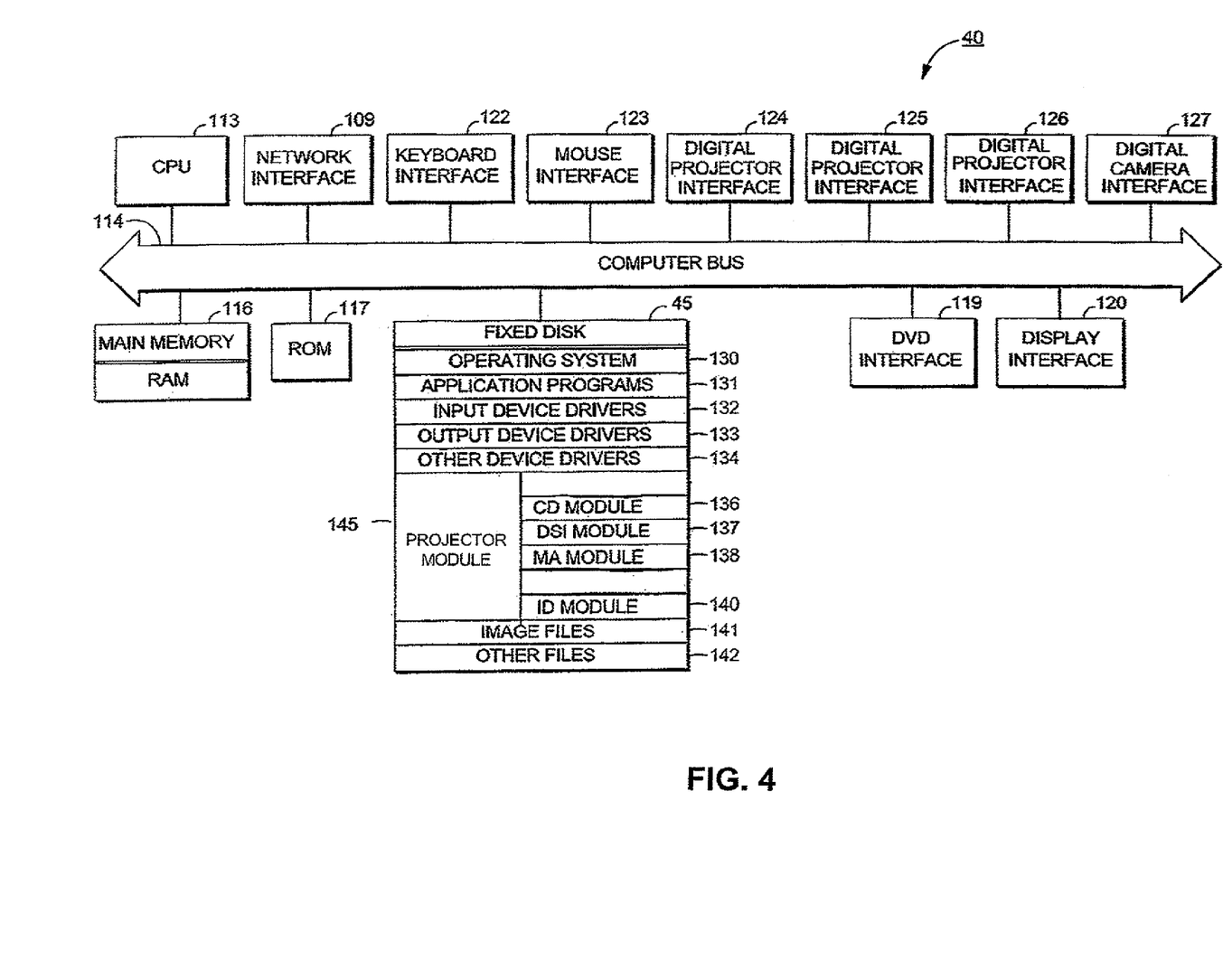
FIG. 4 is a detailed block diagram showing the internal architecture a host computer.

FIG. 4 is a detailed block diagram showing the internal architecture of host computer 40. As shown in FIG. 4, host computer 40 includes central processing unit (CPU) 113 which may be a single-core or a multi-core CPU and which interfaces with computer bus 114.

Also interfacing with computer bus 114 are fixed disk 45, network interface 109, random access memory (RAM) 116 for use as a main run-time transient memory, read only memory (ROM) 117, DVD disk interface 119, display interface 120 for a monitor, keyboard interface 122 for a keyboard, mouse interface 123 for a pointing device, digital projector interface 124 for projector 50, digital projector interface 125 for projector 51, digital projector interface 126 for projector 52, and digital camera interface 127 for digital camera 55.

RAM 116 interfaces with computer bus 114 so as to provide information stored in RAM 116 to CPU 113 during execution of the instructions in software programs such as an operating system, application programs, control modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 4, fixed disk 45 contains computer-executable process steps for operating system 130, and application programs 131, such as graphic image management programs. Fixed disk 45 also contains computer-executable process steps for device drivers for software interface to devices, such as input device drivers 132, output device drivers 133, and other device drivers 134. Image files 141, including color image files, and other files 142 are available for output to color output devices and for manipulation by application programs.

Projector module 145 comprises computer-executable process steps executed by a computer for control of a multiprojector system, where the multiprojector system includes multiple projectors arranged in a projector array. Projector module 145 determines a location of a maximum rectangular area within available regions within a composite projection area formed on a projection surface by a projector array of multiple projectors. Available regions comprise regions unoccupied by previously-located rectangular areas. The projector module 145 removes the maximum rectangular area from the available regions. The projector module 145 iteratively repeats the following: determining a location of a next maximum rectangular area and removing the next maximum rectangular area from the available regions, until a stopping condition is met. A list of determined locations for rectangular areas within the composite projection area is provided after the stopping condition has been met.

As shown in FIG. 4, projector module 145 includes, at least, computer-executable process steps for plural modules of this embodiment, including corner detection (CD) module 136, divide source image (DSI) module 137, maximum area (MA) module 138, and image display (ID) module 140.

CD module 136 is constructed to detect a corner of each individual projection area projected by each of projectors 50 to 52 in order to determine which projector in the projector array is responsible for projecting a particular individual projection area. The corner of the individual projection area is detected by causing digital camera 55 to capture an image of each individual projection area projected by each of the projectors in the projector array, and analyzing the captured image.

DSI module 137 is constructed to divide an input image to be projected by projectors 50 to 52 into sub-images based on the individual projection area projected by each of the projectors in the projector array. In some cases, DSI module 137 divides the input image into sub-images based on an aspect ratio of the input image.

MA module 138 is constructed to calculate rectangular areas for the composite projection area. In some cases, the aspect ratio of the input image may also be used to determine the rectangular areas. As described above, after a rectangular area is removed from the composite projection area, plural separate projection areas may be identified that are non-overlapping and/or non-contiguous. Each such separate projection area is formed by one or more available regions, and will be referred to hereafter as an object. During the iterative process described below with respect to FIG. 6, MA module 138 calculates a maximum rectangular area for each such object.

ID module 140 is constructed to display the image 60 corresponding to the input image. ID module 140 provides image data to each of the projectors 50 to 52 for display based on the determined locations for rectangular areas provided by MA module 138.

The computer-executable process steps for projector module 145 may be configured as a part of operating system 130, as part of an output device driver such as a projector driver, or as a stand-alone application program such as a multiprojector management system. They may also be configured as a plug-in or dynamic link library (DLL) to the operating system, device driver or application program. For example, projector module 145 according to example embodiments may be incorporated in an output device driver for execution in a computing device, such as a projector driver, embedded in the firmware of an output device, such as a projector, or provided in a stand-alone application for use on a general purpose computer. In one example embodiment described herein, projector module 145 is incorporated directly into the operating system for general purpose host computer 40. It can be appreciated that the present disclosure is not limited to these embodiments and that the disclosed control module may be used in other environments in which control of a multiprojector system is desired.

Figure 5:
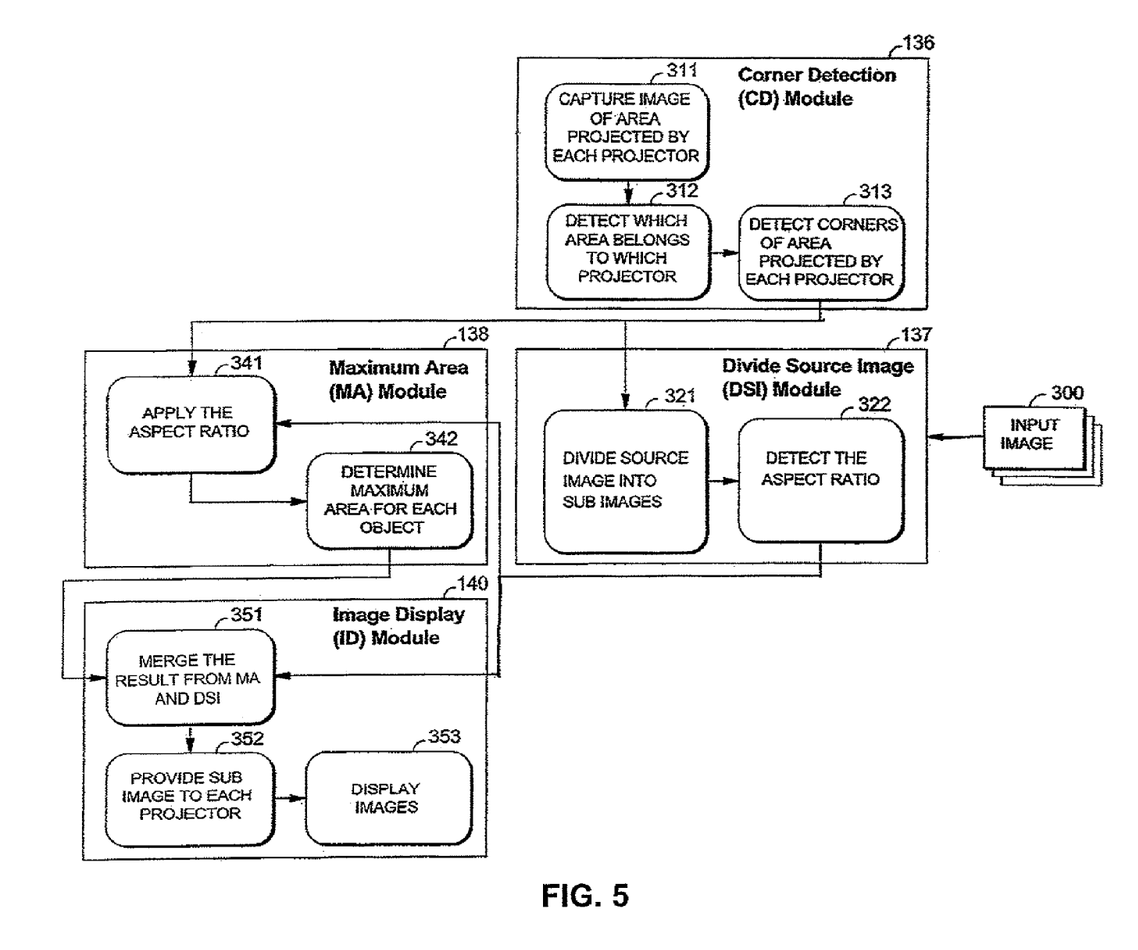
FIG. 5 is a view for explaining software architecture of a projector module for a multiprojector system according to an example embodiment.

FIG. 5 is a view for explaining software architecture of projector module 145 for a multiprojector system according to an example embodiment.

As shown in FIG. 5, CD module 136 outputs coordinates for each of the corners of each of the individual projection areas displayed by projectors 50 to 52. As described above, the individual projection areas form the initial set of available regions. CD module 136 comprises computer-executable process steps to detect a corner of each individual projection area projected by each of projectors 50 to 52 (313) in order to determine which projector in the projector array is responsible for projecting a particular individual projection area (312). The corner of the individual projection area is detected by causing digital camera 55 to capture an image of each individual projection area projected by each of the projectors in the projector array (311), and analyzing the captured image. More specifically, one projector at a time is controlled to display white light, and digital camera 55 captures an image of the individual projection area displayed by the one projector.

In this embodiment, the corners of each of the individual projection areas on the projection surface are detected by analyzing the captured image using, for example, a Canny algorithm to determine the coordinates of each of the corners of the individual projection areas.

DSI module 137 accepts, as input, the coordinates of the corners of each individual projection area from CD module 136 and input image 300. In the example embodiment, based on these inputs, DSI module 137 outputs the aspect ratio of the input image 300, and individual aspect ratios for each sub-image together with the image data for each sub-image. More specifically, DSI module 137 comprises computer-executable process steps to divide input image 300 into sub-images to be projected by each of projectors 50 to 52, based on the individual projection area projected by each of the projectors in the projector array (321). In the example embodiment, DSI module 137 divides input image 300 into sub-images based on aspect ratio information of the input image, including, for example, the individual aspect ratios for each sub-image (322).

In other embodiments, DSI module 137 divides input image 300 based purely on the contents of input image 300, or purely on the characteristics of the multiprojector system, or a combination of both.

In the example embodiment, MA module 138 accepts, as input, the coordinates of the corners of each individual projection area, and the individual aspect ratios of each of the sub-images from DSI module 137. Based on these inputs, MA module 138 outputs coordinates indicating a maximum rectangular area on which an image can be displayed within an object (341), the composite projection area being an initial object for purposes of this description. More specifically, MA module 138 comprises computer-executable process steps to calculate a maximum rectangular area for each object on the projection surface (342), taking into account the individual aspect ratios (341), such that the image is displayed in a maximum rectangular area within a particular object in accordance with the aspect ratio of the input image 300. In other embodiments, the maximum rectangular area for each object on the projection surface (342) is calculated without taking into account the individual aspect ratios (341).

In particular, in this embodiment, the maximum rectangular area is calculated by using a rectangle having the same aspect ratio as input image 300. Based on the coordinates of the corners of each individual projection area and the coordinates of the corners of each previously-located rectangle, the edges of each object are determined. For each object, a rectangle having the same aspect ratio as input image 300 is inscribed beginning at the upper left corner of the object, such that the rectangle meets the object at two edges. The size of the rectangle is increased, while maintaining the same aspect ratio, until a point on the rectangle meets a third edge of the object. The process is then repeated beginning at the upper right corner of the object, and the results of the two processes are compared such that coordinates indicating the position of a maximum rectangular area within each object are determined. While the above-discussed process has been provided here as an example, any suitable method of determining the maximum rectangular area for display may be used. In particular, methods of determining the maximum rectangular area that involve increasing the size of the rectangle without maintaining the same aspect ratio may be used.

ID module 140 accepts, as input, the coordinates indicating the determined locations for rectangular areas on which images can be displayed from MA module 138, and sub-images from DSI module 137. Based on these inputs, ID module 140 outputs sub-images to each of projectors 50 to 52 in the projector array, such that each projector displays the appropriate portion of the image on a corresponding rectangular area within the composite projection area on the projection screen, and such that the image is substantially aligned with the projection screen.

More specifically, ID module 140 comprises computer-executable process steps to cause projectors 50 to 52 to form image 60 corresponding to the input image 300 (353). ID module 140 provides image data to each of the projectors 50 to 52 for display (352) based on the locations for rectangular areas calculated by MA module 138 (351). In particular, ID module 140 scales and shifts each sub-image to adjust the sub-images for display on the rectangular areas.

Figure 6:
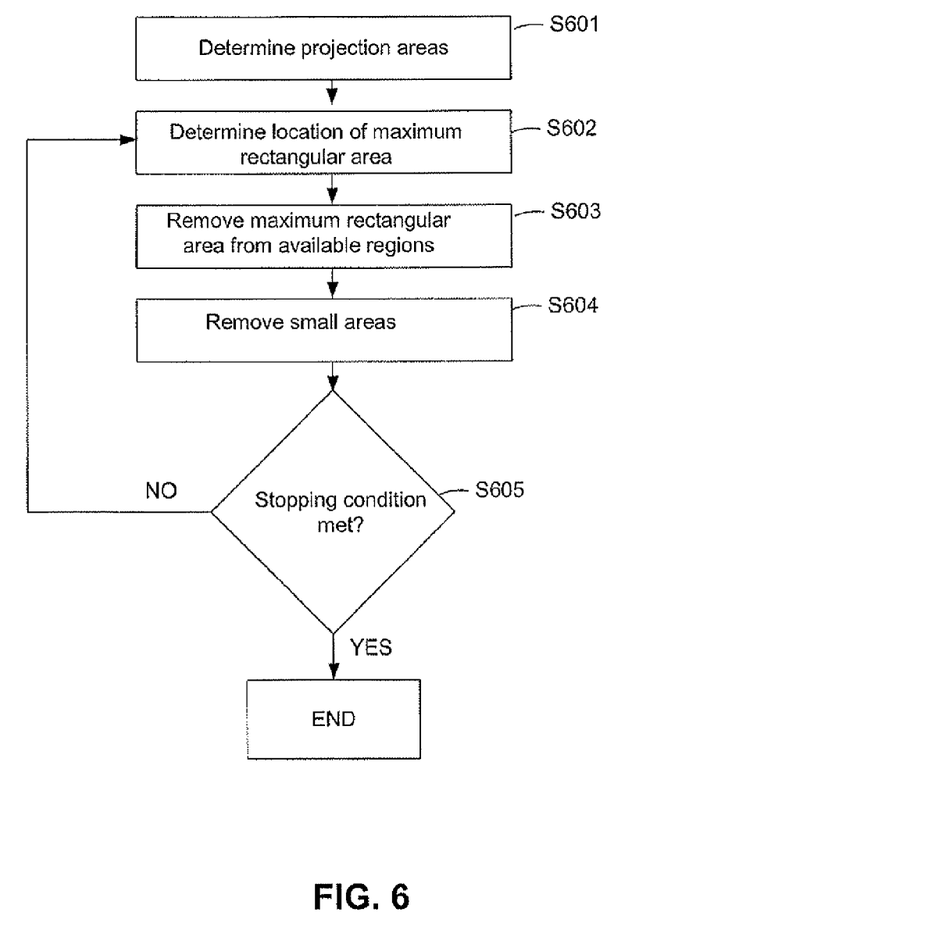
FIG. 6 is a flow diagram for explaining control of a multi-projector system according to an example embodiment.

FIG. 6 is a flow diagram for explaining control of a multi-projector system according to an example embodiment. The process steps shown in FIG. 6 are computer-executable process steps stored on a computer-readable memory medium such as at 145 on fixed disk 45, and are executed by CPU 113 of host computer 40, so as to implement a projector module for control of a multiprojector system including multiple projectors arranged in a projector array. Briefly, according to the process steps shown in FIG. 6, a location of a maximum rectangular area is determined within available regions within the composite projection area. Available regions comprise regions unoccupied by previously-located rectangular areas. The maximum rectangular area is removed from the available regions. The following are iteratively repeated: determining a location of a next maximum rectangular area and removing the next maximum rectangular area from the available regions, until a stopping condition is met. A list of determined locations for rectangular areas within the composite projection area is provided after the stopping condition has been met.

In more detail, in step S601, CD module 136 causes digital camera 55 to capture an image of each individual projection area projected by each of the projectors in the projector array. CD module 136 analyzes the captured image to determine coordinates for corners of each individual projection area. In this embodiment, the corners of each of the individual projection areas on the projection surface are detected by analyzing the captured image using, for example, a Canny algorithm. DSI module 137 accepts, as input, the coordinates of the corners of each individual projection area from CD module 136. DSI module 137 also accepts, as input, the input image 300. In the example embodiment, based on these inputs, DSI module 137 divides input image 300 into sub-images based on aspect ratio information of the input image, including, for example, the individual aspect ratios for each sub-image.

In step S602, MA module 138 accepts, as input, the coordinates of the corners of each individual projection area from CD module 136, and determines the location of a maximum rectangular area on which the image can be displayed within available regions of the composite projection area, the available regions being determined by the coordinates received from CD module 136.

In the example embodiment, MA module 138 determines the location of the maximum rectangular area of the composite projection area, formed by the available regions, by inscribing a rectangle having the same aspect ratio as input image 300 beginning at the upper left corner of the composite projection area, such that the rectangle meets the composite projection area at two edges. The size of the rectangle is increased, while maintaining the same aspect ratio, until a point on the rectangle meets a third edge of the composite projection area. The process is then repeated beginning at the upper right corner of the composite projection area, and the results of the two processes are compared such that coordinates indicating the position of a maximum rectangular area within the composite projection area are determined. In the example embodiment, the coordinates indicate corners of the maximum rectangular area, and the coordinates are based on a virtual coordinate system of the projection surface.

While the above-discussed process has been provided here as an example, any suitable method of determining the maximum rectangular area for display may be used. In particular, methods of determining the maximum rectangular area that involve increasing the size of the rectangle without maintaining the same aspect ratio may be used.

In step S603, MA module 138 removes the maximum rectangular area from the available regions. In the example embodiment, MA module 138 effects removal of the maximum rectangular area from the available regions by determining a new set of available regions based on the coordinates indicating the position of the maximum rectangular area. In particular, the coordinates for the available regions are updated such that the available regions do not include the region identified by the coordinates indicating the position of the maximum rectangular area. In other words, the updated coordinates identify new available regions, such that no region is included, in whole or in part, within the maximum rectangular area. These new available regions may form one or more objects.

In the example embodiment, in step S604, MA module 138 removes small objects (i.e., small areas) that do not exceed a minimum threshold from the available regions. In the example embodiment, MA module 138 effects removal of the small objects by determining coordinates for the corners of each small object, and updating the coordinates for the available regions such that the available regions do not include the small objects identified by the determined coordinates. In other embodiments, small objects are not removed. In the example embodiment, the minimum threshold for small objects is specified by at least one of a minimum area, a minimum height, a minimum width, and a minimum number of pixels.

In the example embodiment, in step S605, MA module 138 determines whether a stopping condition has been met. In the example embodiment, the stopping condition is met when it is determined that there are no available regions within the composite projection area that exceed a minimum area threshold. The minimum threshold is specified by at least one of a minimum area, a minimum height, a minimum width, and a minimum number of pixels of a region within the composite projection area. In other embodiments, rather than basing the stopping condition on such a determination for available regions, the stopping condition is based on such a determination for objects formed by more than one available region.

In a case where MA module 138 determines that the stopping condition has been met ("YES" in step S605), MA module 138 provides a list of determined locations for rectangular areas within the composite projection area to ID module 140. In the example embodiment, the multiple rectangular areas are mutually exclusive of each other. However, in other embodiments, the multiple rectangular areas might not be mutually exclusive of each other.

The determined locations for rectangular areas are used by ID module 140 to display the sub-images provided by DSI module 137 within one or more of the rectangular areas on the projection surface. In the example embodiment, input image 300 comprises plural sub-images, DSI module 137 divides input image 300 to obtain each of the plural sub-images, and ID module 140 displays each of the plural sub-images in a respective rectangular area on the projection surface.

In a case where MA module 138 determines that the stopping condition has not been met ("NO" in step S605), MA module 138 performs a next iteration by repeating the steps of determining location of a next maximum rectangular area (S602), removing the next maximum rectangular area from the available regions (S603), and removing small objects that do not exceed a minimum threshold (S604), until the stopping condition is met. As described above, after a maximum rectangular area is removed from the available regions, plural separate objects may be formed by the remaining regions. In such a case, MA module 138 performs steps S602 to S604 for each such object, either in parallel in a single iteration, or in sequence in successive iterations, in accordance with any suitable order.

Furthermore, in this embodiment, DSI module 137 divides input image 300 in step S601 before MA module 138 determines the maximum area. However, the order of operation of DSI module 137 and MA module 138 is interchangeable, and alternatively can be performed in parallel.

Figure 7A:
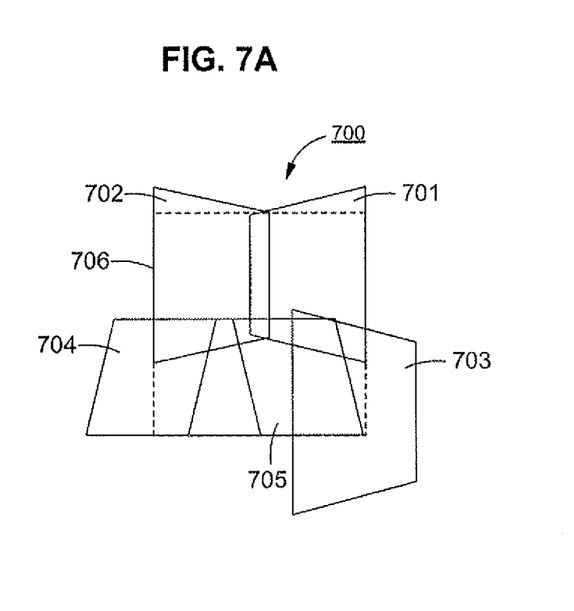
FIGS. 7A to 7F illustrate the determination of rectangular areas according to an example embodiment.

FIGS. 7A to 7F illustrate the determination of rectangular areas in successive iterations. FIG. 7A depicts a composite projection area 700 formed by individual projection areas 701 to 705 formed by five different projectors. Rectangular area 706 is determined to be the maximum rectangular area in composite projection area 700 during a first iteration.

Figure 7B:
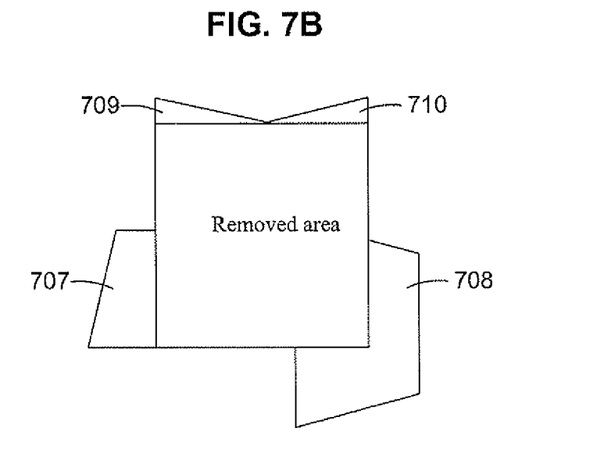

FIG. 7B depicts the available regions 707 to 710 after removal of the maximum rectangular area in the first iteration. Each of available regions 707 to 710 form a single, separate object. The objects formed by each of available regions 707 and 708 exceed the minimum threshold, and the objects formed by each of available regions 709 and 710 do not exceed the minimum threshold.

Figure 7C:
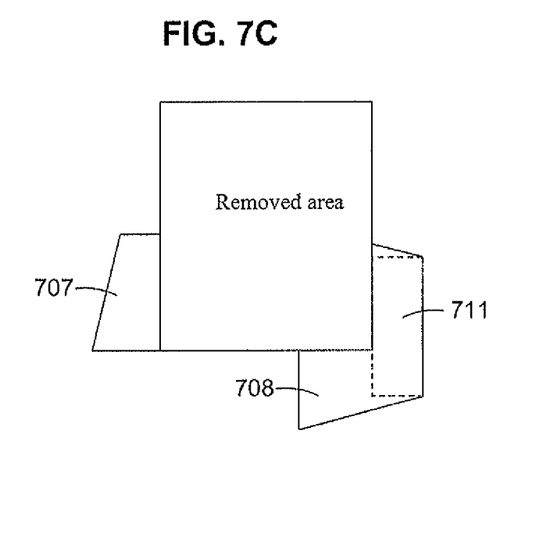

FIG. 7C depicts the removal of available regions 709 and 710, and the determination of a new maximum rectangular area 711 during a second iteration. As shown in FIG. 7C, rectangular area 711 is within the object formed by available region 708.

Figure 7D:
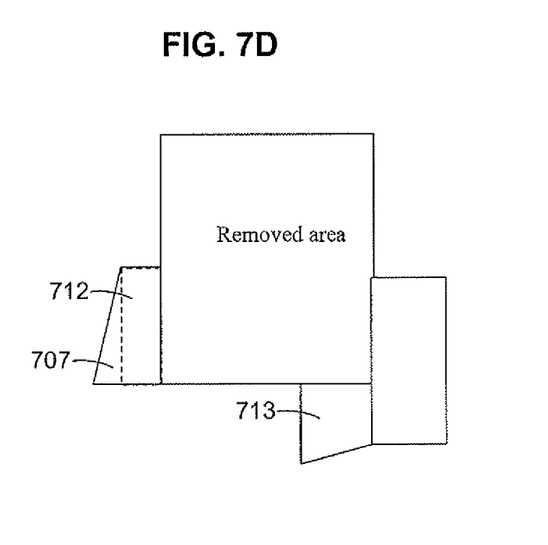

FIG. 7D depicts a third iteration in which a new maximum rectangular area 712 is determined in the object formed by available region 707. FIG. 7D shows the removal of rectangular area 711 and the adjacent small objects, as well as new available area 713, resulting from the second iteration.

Figure 7E:
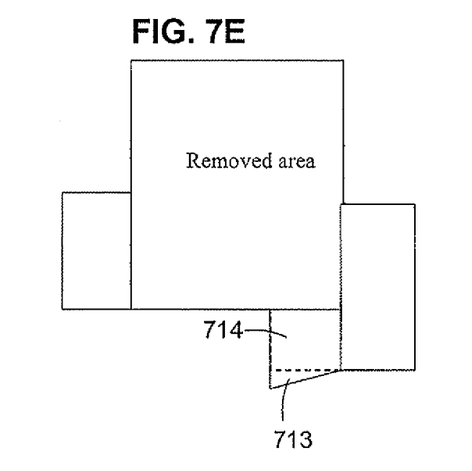

FIG. 7E depicts a fourth iteration in which a new maximum rectangular area 714 is determined in the object formed by available region 713. FIG. 7E shows the removal of rectangular area 712 and the adjacent small object resulting from the third iteration.

Figure 7F:
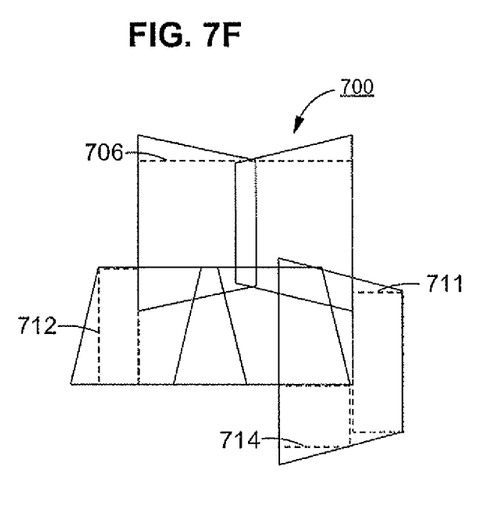

FIG. 7F depicts determined locations for rectangular areas 706, 711, 712 and 714 within the composite projection area 700 after the stopping condition has been met. As shown in FIG. 7F, separate images may be be displayed in each of rectangular areas 706, 711, 712 and 714 on the projection surface.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for determining location of multiple rectangular areas within a composite projection area formed on a projection surface by a projector array of multiple projectors, the method comprising:
   determining location of a maximum rectangular area within available regions within the composite projection area, wherein available regions comprise regions unoccupied by previously-located rectangles;
   removing the maximum rectangular area from the available regions;
   removing small areas that do not exceed a minimum threshold from the available regions after removing the maximum rectangular area from the available regions and before a next iteration of determining location of a maximum rectangular area within the available regions, wherein the minimum threshold is specified by the minimum number of pixels of a region within the composite projection area;
   iteratively repeating the steps of determining location of a next maximum rectangular area, removing the next maximum rectangular area from the available regions, and removing small areas, until a stopping condition is met;
   providing a list of determined locations for rectangular areas within the composite projection area after the stopping condition has been met; and
   projecting an image into one or more of the determined rectangles using the projector array.

2. The method of claim 1, wherein the stopping condition comprises a determination of whether available regions within the composite projection area exceed a minimum area threshold, and the stopping condition is met when it is determined that there are no available regions that exceed the minimum area threshold.

3. The method of claim 1, wherein the minimum threshold is further specified by at least one of a minimum area, a minimum height, a minimum width, and a minimum number of pixels of a region within the composite projection area.

4. The method of claim 1, wherein in the step of determining the location of a maximum rectangular area, the maximum rectangular area is constrained to a predesignated aspect ratio.

5. The method of claim 1, wherein the multiple rectangular areas are mutually exclusive of each other.

6. A module for determining location of multiple rectangular areas within a composite projection area formed on a projection surface by a projector array of multiple projectors, the module comprising:
   a determining module constructed to determine location of a maximum rectangular area within available regions within the composite projection area, wherein available regions comprise regions unoccupied by previously-located rectangles;

a first removing module constructed to remove the maximum rectangular area from the available regions;

a second removing module constructed to remove small areas that do not exceed a minimum threshold from the available regions after removing the maximum rectangular area from the available regions and before a next iteration of determining location of a maximum rectangular area within the available regions, wherein the minimum threshold is specified by the minimum number of pixels of a region within the composite projection area;

an iteration module constructed to use the determining module and the first and second removing modules to iteratively repeat the steps of determining location of a next maximum rectangular area, removing the next maximum rectangular area from the available regions, and removing small areas, until a stopping condition is met; and a list module constructed to provide a list of determined locations for rectangular areas within the composite projection area after the stopping condition has been met.

7. The module of claim 6, wherein the stopping condition comprises a determination of whether available regions within the composite projection area exceed a minimum area threshold, and the stopping condition is met when it is determined that there are no available regions that exceed the minimum area threshold.

8. The module of claim 6, wherein the minimum threshold is further specified by at least one of a minimum area, a minimum height, a minimum width, and a minimum number of pixels of a region within the composite projection area.

9. The module of claim 6, wherein during the determination of the location of a maximum rectangular area, the maximum rectangular area is constrained to a predesignated aspect ratio.

10. The module of claim 6, wherein the multiple rectangular areas are mutually exclusive of each other.

11. The module of claim 6, further comprising projection of an image into one or more of the determined rectangles using the projector array.

12. An apparatus for determining location of multiple rectangular areas within a composite projection area formed on a projection surface by a projector array of multiple projectors, the apparatus comprising:

a computer-readable memory constructed to store computer-executable process steps; and a processor constructed to execute the computer-executable process steps stored in the memory;

wherein the process steps stored in the memory comprise computer-executable process steps to:

determine location of a maximum rectangular area within available regions within the composite projection area, wherein available regions comprise regions unoccupied by previously-located rectangles;

remove the maximum rectangular area from the available regions;

remove small areas that do not exceed a minimum threshold from the available regions after removing the maximum rectangular area from the available regions and before a next iteration of determining location of a maximum rectangular area within the available regions, wherein the minimum threshold is specified by the minimum number of pixels of a region within the composite projection area;

iteratively repeat the steps of determining location of a next maximum rectangular area, removing the next maximum rectangular area from the available regions, and removing small areas, until a stopping condition is met; and provide a list of determined locations for rectangular areas within the composite projection area after the stopping condition has been met.

13. The apparatus of claim 12, wherein the stopping condition comprises a determination of whether available regions within the composite projection area exceed a minimum area threshold, and the stopping condition is met when it is determined that there are no available regions that exceed the minimum area threshold.

14. The apparatus of claim 12, wherein the minimum threshold is further specified by at least one of a minimum area, a minimum height, a minimum width, and a minimum number of pixels of a region within the composite projection area.

15. The apparatus of claim 12, wherein during the determination of the location of a maximum rectangular area, the maximum rectangular area is constrained to a predesignated aspect ratio.

16. The apparatus of claim 12, wherein the multiple rectangular areas are mutually exclusive of each other.

17. The apparatus of claim 12, further comprising projection of an image into one or more of the determined rectangles using the projector array.

18. A non-transitory computer-readable storage medium on which is retrievably stored computer-executable process steps for determining location of multiple rectangular areas within a composite projection area formed on a projection surface by a projector array of multiple projectors, the process steps comprising:

determining location of a maximum rectangular area within available regions within the composite projection area, wherein available regions comprise regions unoccupied by previously-located rectangles;

removing the maximum rectangular area from the available regions;

removing small areas that do not exceed a minimum threshold from the available regions after removing the maximum rectangular area from the available regions and before a next iteration of determining location of a maximum rectangular area within the available regions, wherein the minimum threshold is specified by the minimum number of pixels of a region within the composite projection area;

iteratively repeating the steps of determining location of a next maximum rectangular area, removing the next maximum rectangular area from the available regions, and removing small areas, until a stopping condition is met; and providing a list of determined locations for rectangular areas within the composite projection area after the stopping condition has been met.

19. The non-transitory computer-readable storage medium of claim 18, wherein the stopping condition comprises a determination of whether available regions within the composite projection area exceed a minimum area threshold, and the stopping condition is met when it is determined that there are no available regions that exceed the minimum area threshold.

20. The non-transitory computer-readable storage medium of claim 18, wherein the minimum threshold is further specified by at least one of a minimum area, a minimum height, a minimum width, and a minimum number of pixels of a region within the composite projection area.

21. The non-transitory computer-readable storage medium of claim 18, wherein during the determination of the location of a maximum rectangular area, the maximum rectangular area is constrained to a predesignated aspect ratio.

22. The non-transitory computer-readable storage medium of claim 18, wherein the multiple rectangular areas are mutually exclusive of each other.

23. The non-transitory computer-readable storage medium of claim 18, further comprising projection of an image into one or more of the determined rectangles using the projector array.

* * * * *